(12) United States Patent
Krenzel et al.

(10) Patent No.: US 6,651,694 B1
(45) Date of Patent: Nov. 25, 2003

(54) INSULATING COVER AND METHOD FOR LIQUID SUPPLY TUBE

(75) Inventors: Ronald L. Krenzel, Longmont, CO (US); Cynthia M. Dyke, Broomfield, CO (US)

(73) Assignee: The Protector Corporation, Louisville, CO (US)

( * ) Notice: Subject to any disclaimer, the term of this patent is extended or adjusted under 35 U.S.C. 154(b) by 258 days.

(21) Appl. No.: 09/907,247

(22) Filed: Jul. 17, 2001

(51) Int. Cl.$^7$ .................................................. F16L 5/00
(52) U.S. Cl. .................... 137/375; 220/703; 224/148.2; 222/175; 493/269; 493/294
(58) Field of Search ........................ 137/375; 220/703; 222/175; 493/269, 294; 224/148.2, 148.4

(56) References Cited

U.S. PATENT DOCUMENTS

| | | |
|---|---|---|
| 4,537,313 A | 8/1985 | Workman |
| 4,581,285 A | 4/1986 | Mahefkey, Jr. |
| 4,679,242 A | 7/1987 | Brockhaus |
| 4,768,714 A * | 9/1988 | Luchsinger ................. 239/142 |
| 4,889,252 A | 12/1989 | Rockom et al. |
| 5,237,838 A | 8/1993 | Merritt-Munson |
| 5,265,960 A | 11/1993 | Shikler |
| 5,385,275 A * | 1/1995 | Billet ...................... 222/175 X |
| 5,403,095 A | 4/1995 | Melk |
| 5,415,002 A * | 5/1995 | Koenig ........................... 62/63 |
| 5,472,279 A | 12/1995 | Lin |
| 5,490,396 A | 2/1996 | Morris |
| 5,595,320 A | 1/1997 | Aghassipour |
| 5,638,979 A | 6/1997 | Shea |
| 5,660,476 A | 8/1997 | DeCoster |
| 5,820,268 A | 10/1998 | Becker et al. |
| 5,857,778 A | 1/1999 | Ells |
| 5,911,406 A * | 6/1999 | Winefordner et al. .. 222/175 X |
| 5,971,357 A * | 10/1999 | Denton et al. .......... 251/342 X |
| 6,007,245 A | 12/1999 | Looy |
| 6,039,305 A * | 3/2000 | Hoskins et al. ............. 251/342 |
| 6,364,168 B1 * | 4/2002 | Gardner et al. ............. 222/175 |

* cited by examiner

*Primary Examiner*—Kevin Lee
(74) *Attorney, Agent, or Firm*—Harold A. Burdick

(57) ABSTRACT

Covers, containers, multi-ply insulators and methods are disclosed for maintaining a desired thermal environment for carried or conveyed materials. The insulating cover of this invention for use over a liquid supply tube of the type associated with body mountable hydration pack system includes a multi-ply envelope having outer and inner material layers, the outer layer having an outwardly facing reflective surface, preferably a silver MYLAR with knit backing. The inner layer includes an open cell foam with a smooth, inwardly facing, lining.

18 Claims, 8 Drawing Sheets

INSULATING COVER AND METHOD FOR LIQUID SUPPLY TUBE

FIELD OF THE INVENTION

This invention relates to insulating structures, and, more particularly, relates to insulating covers and methods for fluid conduits.

BACKGROUND OF THE INVENTION

Insulating bags, cases and containers have heretofore been suggested and/or utilized (see U.S. Pat. Nos. 5,237, 838, 5,490,396, 5,472,279, 5,638,979, 5,820,268, 5,857,778, 5,660,476, 5,403,095, 4,679,242, 4,537,313, 5,265,960 and 4,889,252, for example). Such articles have met with varying degrees of success and utilization, but have not always been adequate to specific or varied tasks (i.e., lacking versatility) and/or have been overly expensive. Simpler, less expensive, insulating articles and/or more complex materials have both been suggested (see, for example, U.S. Pat. Nos. 5,595,320, 6,007,245 and 4,581,285) for specific applications but not across a range of applications and/or at reasonable expense.

In particular, for some applications no insulative solution has been heretofore suggested for keeping materials at a desired temperature. For example, the fluid in the supply tube of a typical hydration pack (i.e., fluid in transit between the storage bladder and the dispensing mouthpiece) is exposed to ambient, sometimes for extended periods. The consequence is that the first sip a user takes after such exposure is usually unsatisfying and/or distasteful, particularly when exposed to warming in the tube. In the case of cold exposure, the fluid may actually freeze in the tube thus blocking dispensing.

It would thus be desirable to provide insulating covers, materials and/or containers that are simple and inexpensive to produce, including material construction that is versatile across a range of structures and applications. In particular, it would be desirable to provide such a cover applicable for use with the liquid supply tube in a hydration pack assembly.

SUMMARY OF THE INVENTION

This invention provides an insulating cover and method for fluid conduits, and is particularly well adapted, for example, for use with the liquid supply tube of a hydration pack extending between a valved mouthpiece and the pack borne fluid containment reservoir (or bladder).

The cover includes a first material layer having a reflective surface and a second material layer including an open cell foam (preferably lined), the layers being coextensive. Together, the first and second layers form a multi-ply insulator, the insulator being secured to itself at opposite edges to form an envelope having the reflective surface of the first material layer at the exterior thereof. The multi-ply tube receiving envelope thus formed has open ends, with the length between the open ends approximating the length of a hydration pack supply tube in the preferred embodiment of this invention.

The method of this invention utilized for insulating a hydration pack liquid supply tube includes the steps of forming a multi-ply tube receiving envelope having opposite open ends, ply's of which are attached only at envelope forming seams. The hydration pack liquid supply tube is threaded through the envelope. Thereafter either a valved mouthpiece or a liquid reservoir is attached at one end of the tube.

It is therefore an object of this invention to provide an insulating cover and method for fluid conduits.

It is another object of this invention to provide an insulating cover and method for a liquid supply tube of a hydration pack.

It is still another object of this invention to provide insulating covers that are simple and inexpensive to produce, including material construction that is versatile across a range of structures and applications.

It is yet another object of this invention to provide an insulating cover for use over a liquid supply tube that includes a first material layer having a reflective surface and a second material layer including an open cell foam and coextensive with the first material layer, the first and second material layers together forming a multi-ply insulator, the multi-ply insulator secured to itself at opposite edges to form a tube receiving envelope with the reflective surface of the first material layer at the exterior thereof.

It is still another object of this invention to provide a hydration pack liquid supply tube insulating cover including a multi-ply envelope having open ends, with a length between the open ends approximating hydration pack supply tube length, the multi-ply envelope including an outer layer having a reflective outwardly facing surface and an inner layer including a lined open cell foam.

It is still another object of this invention to provide a hydration pack liquid supply tube insulating method including the steps of forming a multi-ply tube receiving envelope having opposite open ends, ply's of which are attached only at envelope forming seams, and threading a hydration pack liquid supply tube through the envelope and thereafter attaching one of a valved mouthpiece and a liquid reservoir to the tube.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
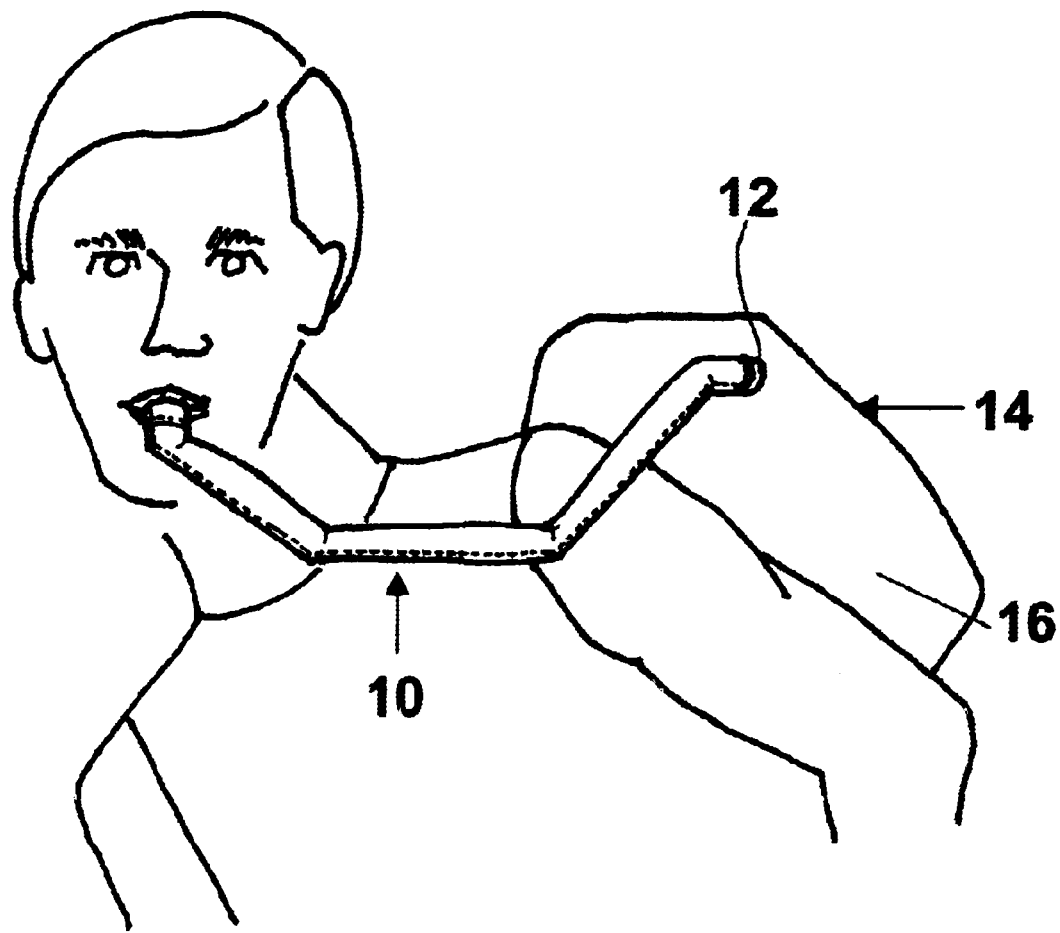
FIG. 1 is a perspective view illustrating the insulating cover of this invention in use on the liquid supply tube of a typical hydration pack.

As illustrated in the drawings, this invention broadly entails materials, apparatus and methods to provide improved insulation capability, for both hot and cold environments, and in particular by means of sewn or assembled products combining specific materials in multi-ply constructions. As used herein, "multi-ply" means a construction having more than one distinct and separate layer of material.

More specifically, the drawings illustrate various materials and products illustrative of a range of possible constructions, including soft-sided cases, holders, covers, or pouches that can be utilized to transport and insulate goods or materials such as cosmetics, foods (both liquid and solid), medical products or materials, fluid carrying bottles, bladders and/or liquid feed tubes in hydration packs, and other products or materials that react adversely to extreme temperatures.

Figure 2:
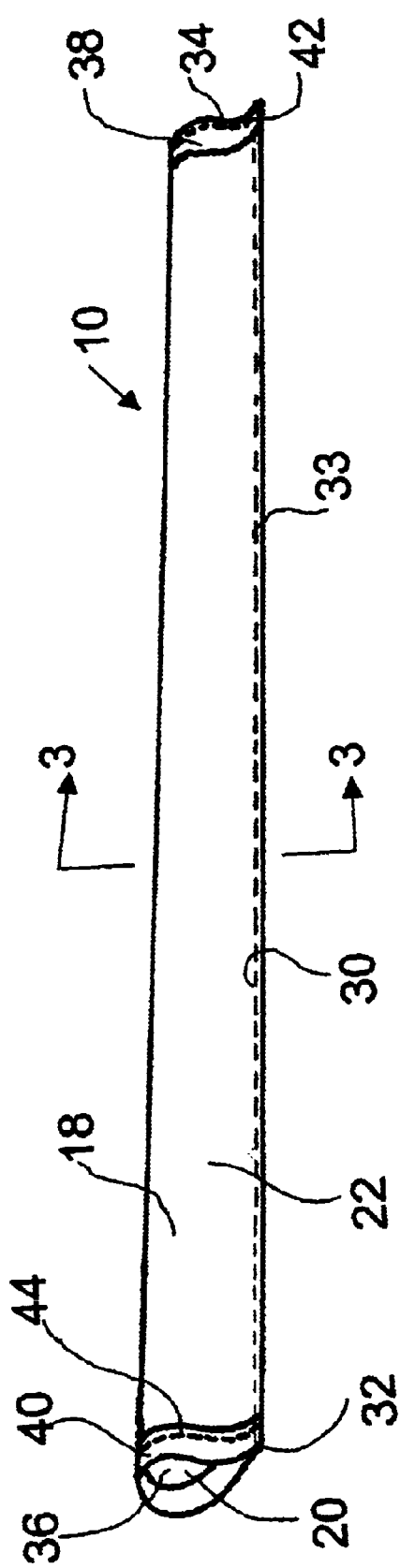
FIG. 2 is a perspective view of the cover of FIG. 1.
Figure 3:
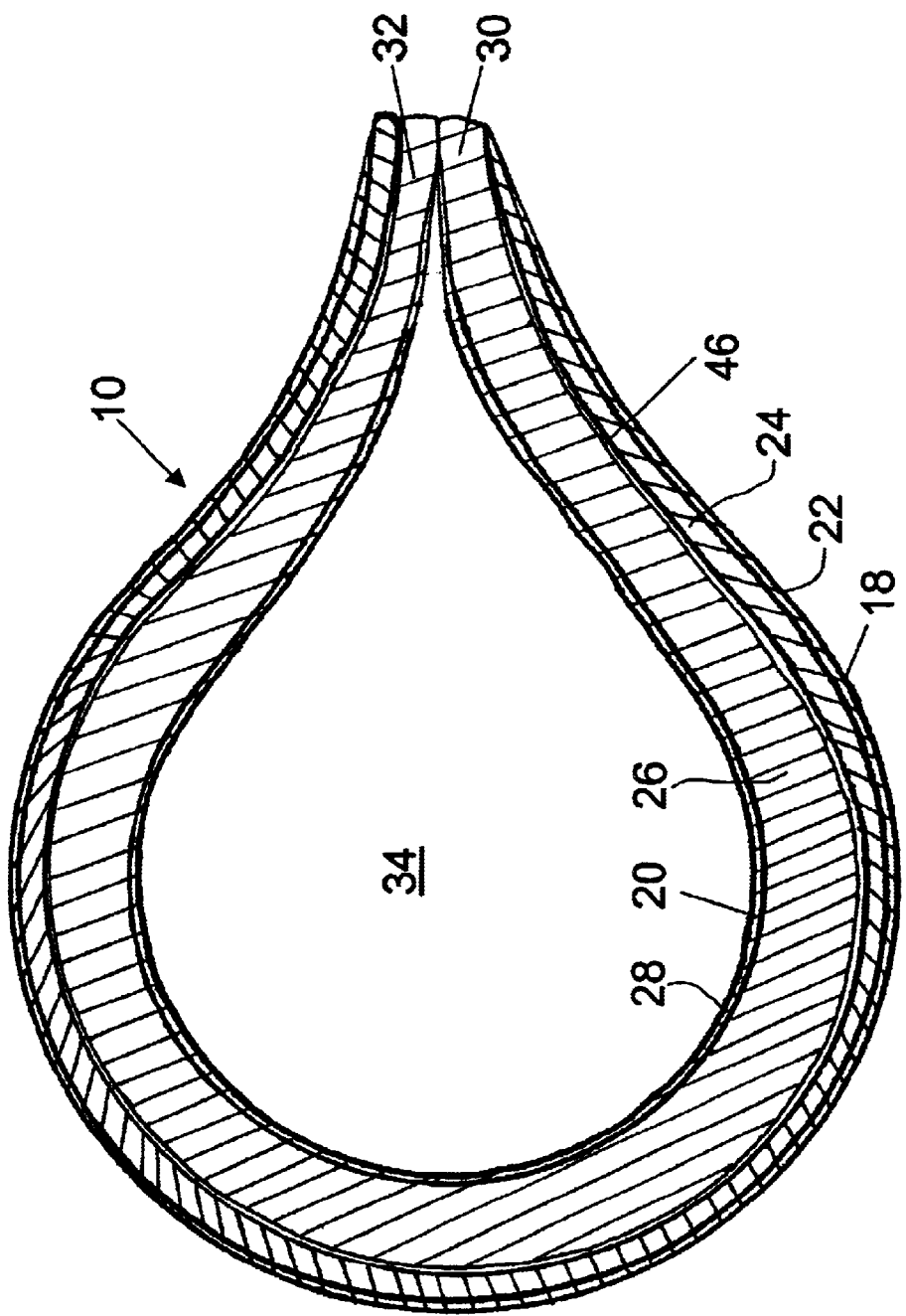
FIG. 3 is a sectional view taken through section lines 3—3 of FIG. 2.

FIGS. 1 through 3 illustrate a first (and preferred for purposes of the present application) embodiment 10 of an insulating cover for use over a liquid supply tube 12, in the case illustrated in FIG. 1 of the type associated with body mountable hydration pack system 14 and extending between a bladder, or reservoir (not shown) in pack 16 and a valved mouthpiece (in the user's mouth in FIG. 1). The valved mouthpiece allows the user to sip liquid contained in the bladder through the flexible supply tube 12 and then release the mouthpiece without dribbling liquid therefrom. Cover 10 is thus, of necessity, a flexible cover.

Turning to FIGS. 2 and 3, cover 10 includes an outer layer, or ply, of material 18 and an inner layer, or ply, of material 20. Outer layer 18 has an outwardly facing reflective surface 22, preferably of MYLAR, and may be constructed of silver "kid" MYLAR with white knit backing 24, a known laminate. Inner layer 20 includes open cell foam 26, preferably a dark colored (charcoal for example) ester open cell foam with a smooth, inwardly facing, lining 28 (VELCRO compatible tricot, for example). The lined foam preferably finishes 5/16th inches, for an overall multi-ply insulator material finishing under ½" thick. Lining 28 is bonded to foam 26 and is selected to accommodate ease of tube insertion and withdrawal through finished cover 10.

To form cover 10, dimensionally coextensive material layers (18 and 20) are cut from a pattern, material length selected to approximate the length of the tube to be covered and width selected to accommodate snug fit over a tube of given diameter when the cover is finished. Layer 20 is lain atop layer 18 and the layers are secured to one another and to themselves at opposite edges 30 and 32 (at seam 33 using, for example, #69 nylon bonded thread) to form a multi-ply tube receiving envelope having open ends 34 and 36. Assembly leaves reflective surface 22 at the exterior of the envelope, and lining 28 at its interior. One inch nylon binding 38 and 40 binds ends 34 and 36, respectively. As may be appreciated, layers 18 and 20 of the multi-ply insulator are thus attached only at envelope forming seams (seam 33 and binding seams 42 and 44) thereby providing air space 46 in finished cover 10 between layers 18 and 20.

In use, tube 12 is threaded through one of ends 34 or 36 and through cover 10 to the other of the ends. In the case of a hydration pack supply tube, once the tube has been thus encased, the pack bladder or valved mouthpiece is then attached to one end of the tube. The other end of the tube may be attached before or after tube insertion in cover 10 to the other of the mouthpiece or the pack bladder. The cover may be provided as a separately packaged and sold item, as original equipment with a hydration pack, or constructed and sold integrally with replacement tubes or replacement tubes and mouthpieces.

Usage of cover 10 with hydration pack supply tubes is beneficial in either the winter (to prevent freezing of liquid in the tube) or the summer (to keep liquid in the tube cool during cessations in transit). Preferably, cover 10 is removable from the tube to allow tube cleaning.

Figure 4:
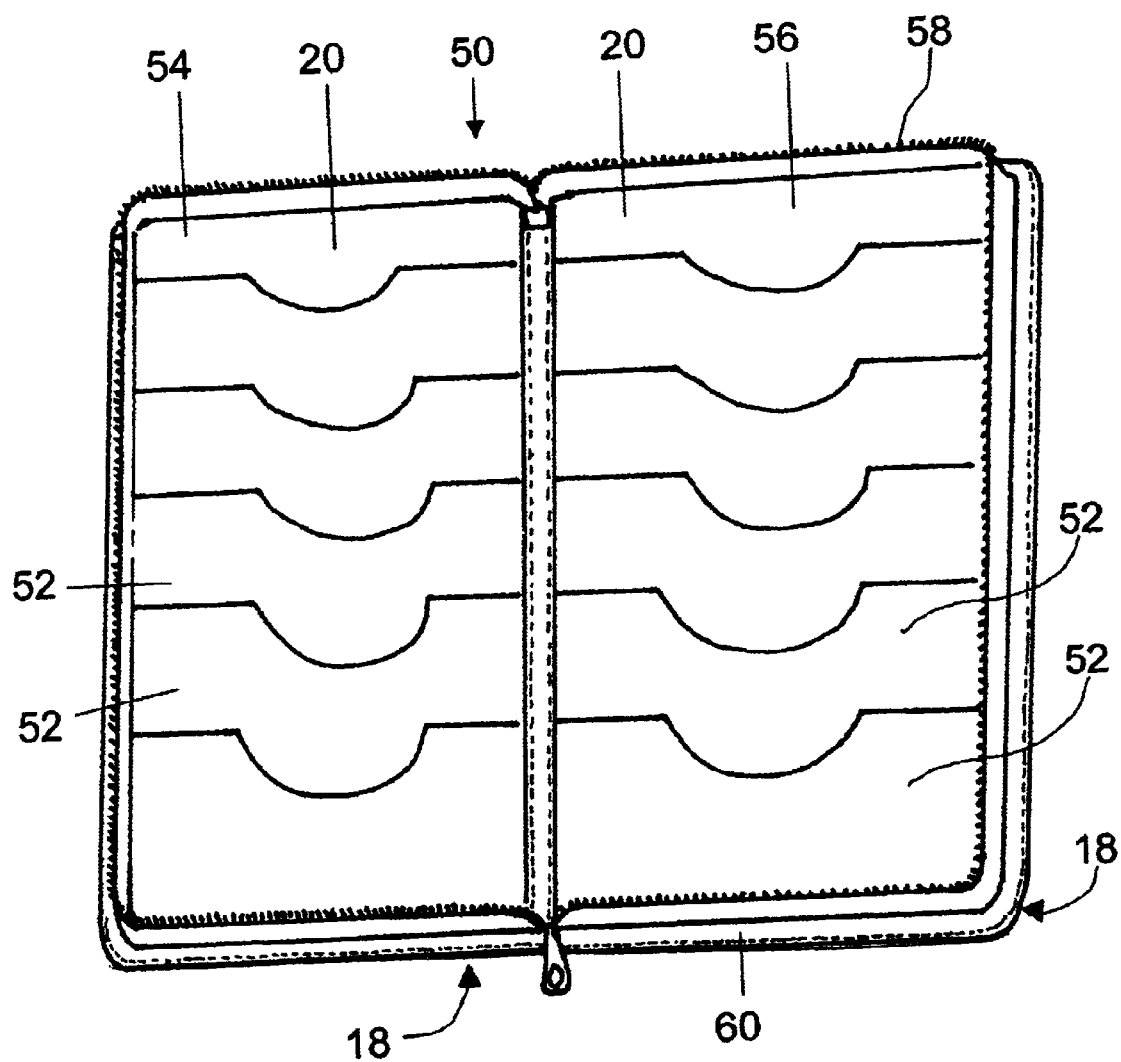
FIG. 4 is a perspective view of a case illustrating another use for the insulating material used in the cover of FIG. 2.
Figure 5:
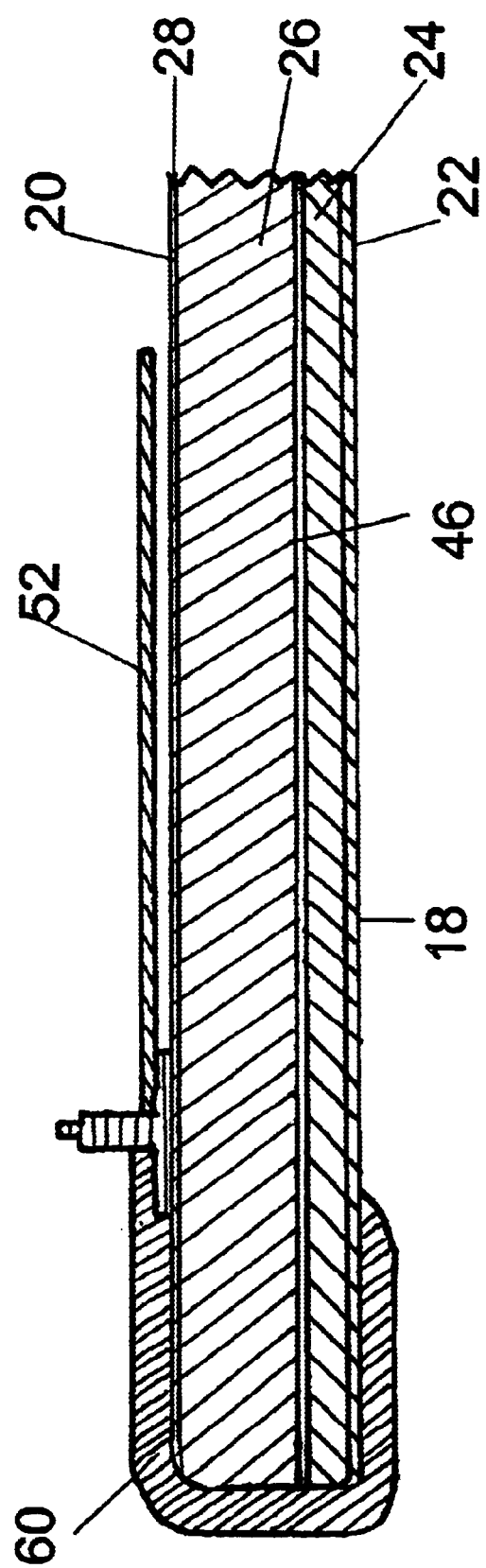
FIG. 5 is a partial sectional view of the case shown in FIG. 4.

FIGS. 4 and 5 illustrate use of the same multi-ply insulator material as described above in the construction of CD holder, or case, 50, to protect CD's which can become overly heated in automobiles during warm months. Case 50 may be of any typically found design including plural clear or opaque CD separators 52 at multiple leaves 54 and 56 securable by a zipper or other fastener 58 held at the outer periphery at binding 60.

As with cover 10, outer layer, or ply, of material 18 has outwardly facing reflective surface 22, preferably a MYLAR laminated to knit backing 24, thereat. Inner layer 20 includes open cell foam 26, as before preferably a dark colored ester open cell foam with a smooth, inwardly facing, lining 28 bonded to foam 26 to accommodate ease of CD insertion and withdrawal at separators 52.

In another embodiment (illustrated in FIGS. 6 through 8) utilizing a more complex multi-ply insulating material of this invention, containers such as thermal carrying case or bag 65 can be provided having varying carrying capacities and containment chambers 67. Such bags typically include a bag body 69 and closure 71 engagable by zipper or other fastener 73. Various carrying mechanisms may be provided, such as handles 75 or shoulder straps and the like.

Figure 7:
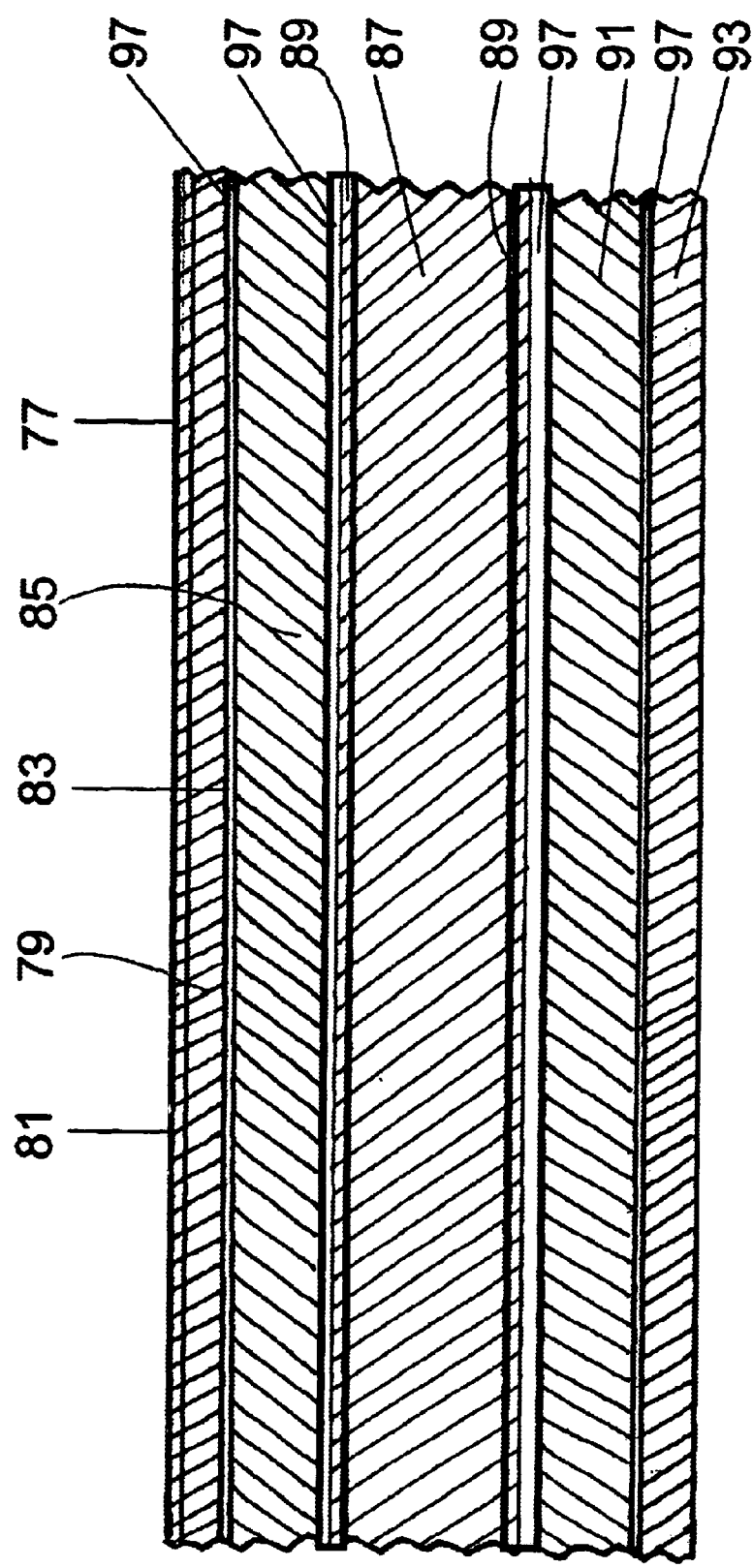
FIG. 7 is a partial sectional view from FIG. 6 showing the insulating material utilized in the case.
Figure 8:
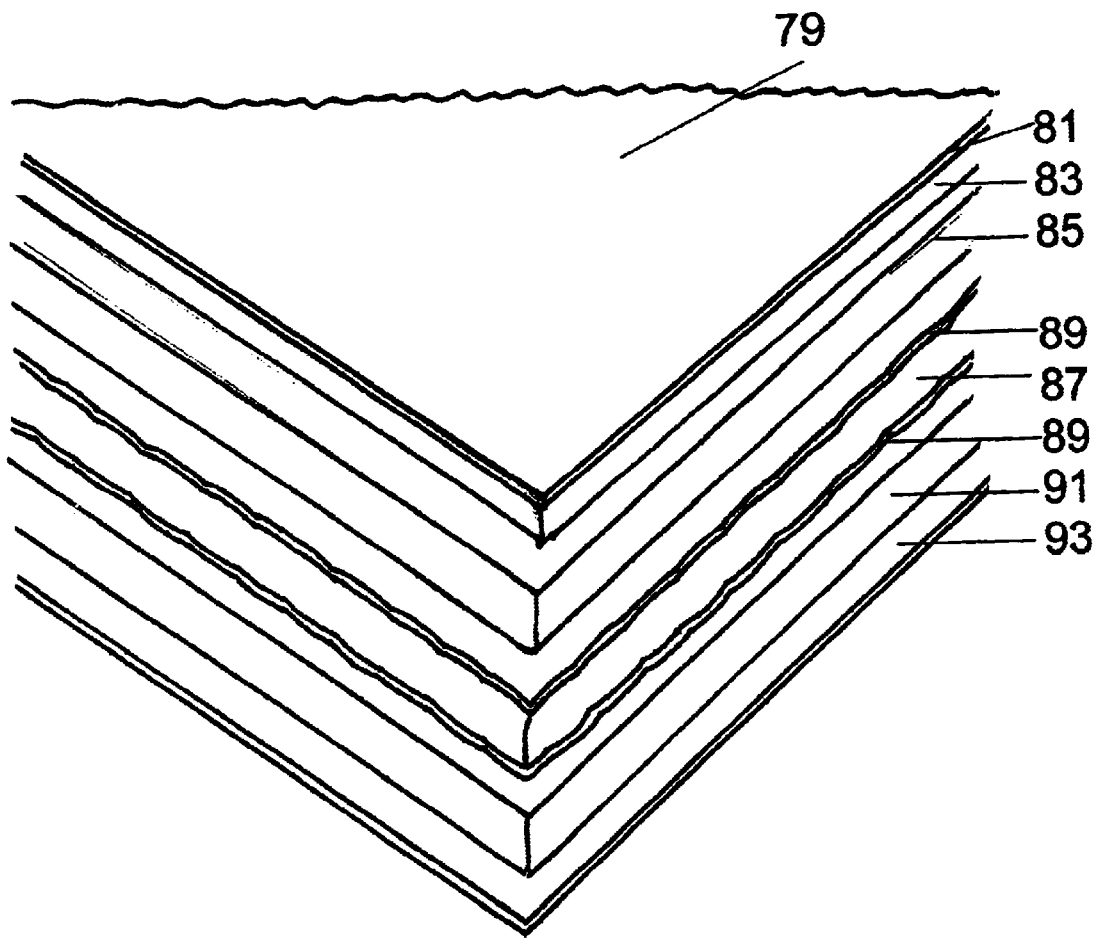
FIG. 8 is a perspective view of an unassembled corner of the plies forming the material utilized in the case of FIG. 6.

In this embodiment, multi-ply thermal wall constructing panels 77 are formed, as shown in FIGS. 7 and 8. The outermost layer, or ply, of material 79, includes outwardly facing reflective surface 81, preferably of MYLAR, and may be a laminate constructed of silver "kid" MYLAR with white knit backing 83.

Open cell foam layer 85, preferably a 3/16th inch, white, ester open cell foam lies beneath layer 79 and over double bubble thermal insulation layer 87 having aluminum foil laminae 89 at each side thereof. A closed cell foam layer 91, preferably a white 1/8th inch cross-linked foam (XJ200, for example) lies between layer 87 and interior lining 93, a 420 denier white pack cloth for example. The various layers of panels 77 are attached to each other only at panel junctions 95 and at various bindings, thus providing air pockets 97 between layers.

Figure 6:
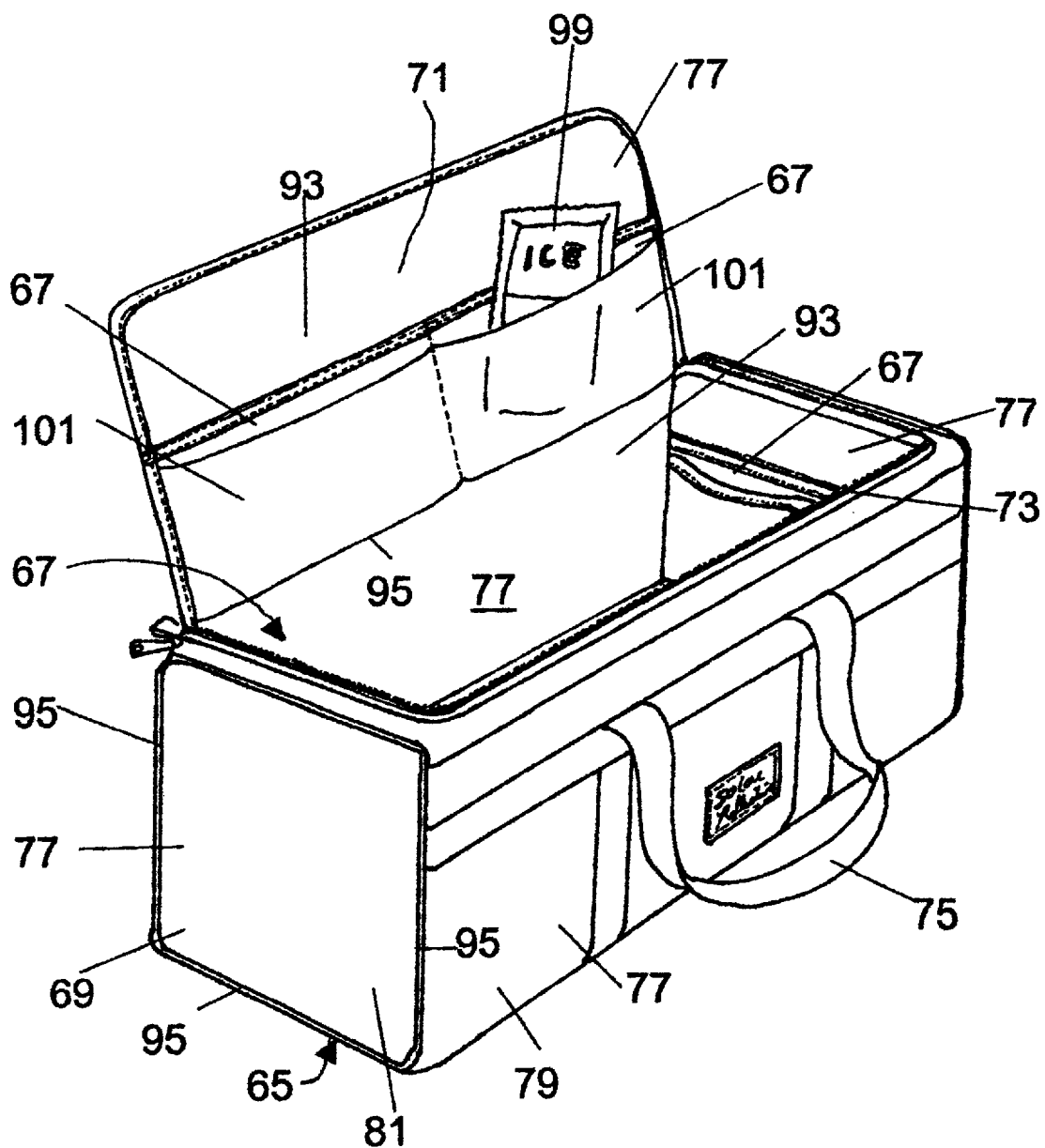
FIG. 6 is a perspective view of a carrying case employing a related insulating material that includes additional layers or plies.

An interior nylon mesh (not shown) of medium weight may be provided if desired. All bindings are typically one inch nylon binding, and the panels, bindings, zippers, handles, fasteners and the like are typically sewn using, for example, nylon thread. As shown in FIG. 6, in order to achieve a desired internal environmental condition, cold packs (for example, BLUE ICE brand) or hot packs (such as the Hot Ice Packs produced by RUBBERMAID) 99 encased in a moisture barrier material (to reduce condensation and protect the bags and contents from moisture) can be provided in a pocket or pockets 101.

Products utilizing the multi-ply panels described above are manufactured utilizing known techniques. Briefly, a pattern is developed and transferred to multi-ply marker paper, the paper being placed over the designated material(s) and the material(s) then cut as per design instructions and sewn/assembled into the product in accord with sewing instructions.

In terms of usage in the field, it is recommended that the case, initially devoid of any contents, be placed in as typical a usage environment as can be secured. Typical usage environments might be the actual automobile in which the case is to be transported or stored, located in a sunny area typical of a common destination, or a room with customary ambient temperatures and during a time of day, or evening, in which the case is commonly stored. If cold or hot packs are to be employed with the contents to be contained or transported in the case, the packs should be prepared (i.e., heated or cooled) as per manufacturer recommendations.

To assure precision control, a temperature probe or thermometer may be placed inside the insulated case and temperature readings taken periodically. The readings can be recorded and compared against manufacturer specifications for the material or product held and protected in the case.

In tests, cosmetics were stored in an automobile within an insulated case 65 with outside temperatures exceeding 90° F. and temperatures in the automobile up to about 135° F. for seven hours. The interior temperature of insulated case 65 did not exceed about 90° F. during the test period.

As may be appreciated from the foregoing, improved insulated covers, multi-ply insulators and containers are provided by this invention which are light weight, versatile, and simple and relatively inexpensive to produce.

What is claimed is:

1. An insulating cover for use over a liquid supply tube, said insulating cover comprising:
   a first material layer having a reflective surface; and
   a second material layer including an open cell foam and coextensive with said first material layer;
   said first and second material layers together forming a multi-ply insulator, said multi-ply insulator secured to itself at opposite edges to form a tube receiving envelope with said reflective surface of said first material layer at the exterior of said envelope.

2. The insulating cover of claim 1 wherein said second material layer includes a smooth lining bonded with said open cell foam, said lining at the interior of said envelope.

3. The insulating cover of claim 1 wherein said first material layer comprises a reflective MYLAR and knit backing laminate.

4. The insulating cover of claim 1 wherein said envelope has open opposite ends, said multi-ply insulator having a binding applied thereto at said opposite ends.

5. The insulating cover of claim 1 further comprising a hydration pack liquid supply tube held in said envelope.

6. The insulating cover of claim 5 further comprising a valved mouthpiece at one end of said tube.

7. A hydration pack liquid supply tube insulating cover comprising a multi-ply envelope having open ends, with a length between said open ends approximating hydration pack supply tube length, said multi-ply envelope including an outer layer having a reflective outwardly facing surface and an inner layer including a lined open cell foam.

8. The tube insulating cover of claim 7 wherein said lined open cell foam of said inner layer includes a smooth inwardly facing lining selected to accommodate ease of liquid supply tube insertion and withdrawal through said envelope.

9. The tube insulating cover of claim 8 wherein said lining is tricot.

10. The tube insulating cover of claim 7 wherein said lined open cell foam is a dark colored open cell foam.

11. The tube insulating cover of claim 7 wherein said outer layer is a silver MYLAR surfaced laminate.

12. The tube insulating cover of claim 7 wherein said inner and outer layers are coextensive and are attached only at envelope forming seams.

13. The tube insulating cover of claim 7 further comprising bindings around said open ends of said multiply envelope.

14. A hydration pack liquid supply tube insulating method comprising the steps of:
    forming a multi-ply tube receiving envelope having opposite open ends, ply's of which are attached only at envelope forming seams; and
    threading a hydration pack liquid supply tube through said envelope and thereafter attaching one of a valved mouthpiece and a liquid reservoir to said tube.

15. The method of claim 14 wherein the step of forming a multi-ply envelope includes the steps of layering first and second material plies coextensively defining an insulator, and securing said insulator to itself at opposite edges.

16. The method of claim 14 wherein the step of forming a multi-ply envelope includes associating an outer ply having a reflective MYLAR surface with an inner ply including an open cell foam.

17. The method of claim 14 wherein the step of forming a multi-ply envelope includes associating an inner ply of tricot lined open cell foam with an outer ply including a knit backing with a reflective outwardly facing surface.

18. The method of claim 14 wherein the step of forming a multi-ply envelope includes the step of binding said envelope at said open ends.

* * * * *